(12) United States Patent
Daubner et al.

(10) Patent No.: US 10,408,036 B2
(45) Date of Patent: Sep. 10, 2019

(54) MEASURING DEVICE AND METHOD FOR MEASURING A HOLE IN THE GROUND

(71) Applicant: BAUER Spezialtiefbau GmbH, Schrobenhausen (DE)

(72) Inventors: Marcus Daubner, Aichach (DE); Kai Gabelunke, Leipzig (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 255 days.

(21) Appl. No.: 15/527,299

(22) PCT Filed: May 12, 2016

(86) PCT No.: PCT/EP2016/060630
§ 371 (c)(1),
(2) Date: May 16, 2017

(87) PCT Pub. No.: WO2016/206856
PCT Pub. Date: Dec. 29, 2016

(65) Prior Publication Data
US 2017/0335672 A1    Nov. 23, 2017

(30) Foreign Application Priority Data

Jun. 23, 2015 (EP) ..................... 15173424

(51) Int. Cl.
*E21B 47/08* (2012.01)
*E21B 47/00* (2012.01)
(Continued)

(52) U.S. Cl.
CPC .......... *E21B 47/0003* (2013.01); *E21B 47/01* (2013.01); *E21B 47/02208* (2013.01);
(Continued)

(58) Field of Classification Search
CPC ............................ E21B 47/0003; E21B 47/04
(Continued)

(56) References Cited

U.S. PATENT DOCUMENTS 2,595,241 A    5/1952    Goble
4,161,715 A    7/1979    Harris
(Continued)

FOREIGN PATENT DOCUMENTS

AT    296 898 B    2/1972
GB    2 156 984 A    10/1985

OTHER PUBLICATIONS

International Search Report issued in PCT/EP2016/060630, dated Aug. 9, 2016.
(Continued)

*Primary Examiner* — Taras P Bemko
(74) *Attorney, Agent, or Firm* — Studebaker & Brackett PC (57) ABSTRACT

A measuring device for measuring a hole in the ground having at least one measuring probe having at least one measurement signal transmitter to transmit a measurement signal, at least one measurement signal receiver to receive the measurement signal reflected on a wall area of the hole, and an evaluation unit for determining a wall distance between the measurement signal transmitter and the wall area of the hole, wherein a measuring distance based on an assignment rule can be assigned to the received, reflected measurement signal. A calibrating device having at least one calibration element. The measurement signal transmitter transmits a calibration signal, which can be reflected on the calibration element, wherein the measurement signal receiver receives the calibration signal reflected on the calibration element. The evaluation unit changes and cali-
(Continued)

brates the assignment rule based on the calibration signal reflected and received by the calibration element.

34 Claims, 1 Drawing Sheet

(51) Int. Cl.
    *E21B 47/01*     (2012.01)
    *E21B 47/022*     (2012.01)
    *G01S 7/52*     (2006.01)
    *G01S 15/88*     (2006.01)
    *E21B 47/04*     (2012.01)
    *G01C 7/02*     (2006.01)
    *G01S 11/14*     (2006.01)
    *G01S 15/89*     (2006.01)

(52) U.S. Cl.
    CPC .............. *E21B 47/04* (2013.01); *E21B 47/08* (2013.01); *E21B 47/082* (2013.01); *G01C 7/02* (2013.01); *G01S 7/52004* (2013.01); *G01S 11/14* (2013.01); *G01S 15/88* (2013.01); *G01S 15/89* (2013.01); *G01S 2007/52014* (2013.01)

(58) Field of Classification Search
    USPC ................................................... 166/250.01
    See application file for complete search history.

(56) References Cited

U.S. PATENT DOCUMENTS

| | | | | |
|---|---|---|---|---|
| 5,568,449 | A * | 10/1996 | Rountree | ............ G01F 23/2962 367/902 |
| 6,611,787 | B2 * | 8/2003 | Stringer | ................ G01B 11/00 702/156 |
| 2005/0281134 | A1 | 12/2005 | Ferreira | |

OTHER PUBLICATIONS koden-electronics.co., Ltd.; Koden Ultrasonic Drilling Monitor DM-602/604; Sep. 2011; XP055231288; Retrieved from the Internet: URL:https://www.koden-electronics.co.jp/eng/industrial/pdf/industrial/dm602604-e.pdf.

International Preliminary Report on Patentability issued in PCT/EP2016/060630; dated Dec. 26, 2017.

* cited by examiner

MEASURING DEVICE AND METHOD FOR MEASURING A HOLE IN THE GROUND

The invention relates to a measuring device for measuring a hole in the ground, having at least one measuring probe that can be lowered into the hole, which has at least one measurement signal transmitter to transmit a measurement signal and at least one measurement signal receiver to receive the measurement signal reflected on a wall area of the hole, and having an evaluation unit for determining a wall distance between the measurement signal transmitter and the wall area of the hole, wherein a measurement distance can be assigned, using an assignment rule, to the received, reflected measurement signal.

The invention further relates to a measuring method for measuring a hole in the ground, wherein at least one measuring probe is lowered with a lowering means into at least one lowering position in the hole, at least one measurement signal transmitter of the measuring probe transmits a measurement signal towards a wall area of the hole, at least one measurement signal receiver of the measuring probe receives the measurement signal reflected on the wall area of the hole, and an evaluation unit determines a wall distance between the measurement signal transmitter and the wall area of the hole, wherein a measurement distance is assigned, based on an assignment rule, to the received reflected measurement signal.

To produce holes in the ground, underground engineering equipment with corresponding tools can be used. These can be in particular drilling tools for producing boreholes or diaphragm wall cutters for producing diaphragm wall panels. To support the ground around the hole, the holes can be filled with a liquid medium, in particular with bentonite suspension as supporting liquid. Subsequently the hole is filled with a settable medium, for example concrete, in order to form a bored pile or a diaphragm wall element. By arranging many piles or diaphragm wall elements one beside the other, a bored pile wall or diaphragm wall can be formed in the concrete. In order to seal these walls in the ground, in particular against ground water penetration, an exact position and form of the bores or slots must be ensured.

It is known in this connection to ascertain, after and/or during the production of the hole, a potential deviation of the hole progression from a predefined direction, in particular relative to the vertical, by means of a measurement of the hole wall. Such a measurement can be realised with distance sensors. Such distance sensors can be used by the person skilled in the art in the known way to determine coordinates of individual points or an extensive point matrix of the wall of the hole.

As a distance sensor known to the person skilled in the art, for example a KODEN ultrasound distance sensor, which is described for example under the product description "Koden Ultrasonic Drilling Monitor DM-602/604" of KODEN Electronics Co., can be used. In the known systems, measurement inaccuracies are not excluded. Adjacent bored piles and slots are therefore arranged with a certain overlap. The higher the degree of overlap, the more labour and materials are required to create a bored pile or diaphragm wall.

U.S. Pat. No. 4,161,715 A describes a measuring probe for measuring a salt dome, wherein the measuring probe is lowered through a borehole into the salt dome. Laser beams are emitted by the measuring probe to measure the distance.

It is the object of the invention to indicate a measuring device and a measuring method for measuring a hole in the ground, with which a particularly exact and reliable measurement is facilitated, and which are flexible in use.

On the one hand the object is achieved according to the invention by a measuring device and on the other hand by a measuring method having the features of the claimed invention. Preferred embodiments of the invention are respectively indicated in the dependent claims.

The measuring device according to the invention is characterised in that a calibrating means connected to the measuring probe is provided, which has at least one calibration element, a calibration distance to at least one measurement signal transmitter is pre-specified and defined by the calibration element, the measurement signal transmitter is designed to transmit a calibration signal, which can reflect on the calibration element, at least one measurement signal receiver is designed to receive the calibration signal reflected on the calibration element, and by means of the evaluation unit the assignment rule can be changed and calibrated using the calibration signal reflected and received by the calibration element.

The invention is based upon the finding that, when measuring a hole filled with suspension, the density and consistency of the suspension influence the measurement signal to an extent that is not insignificant. It was further recognised that, in particular with boreholes filled with bentonite suspension, which can have a depth of 20 m and more, the density and consistency change over the depth. The radially orientated measurements are realised at the same depth so that suspension-related fluctuations are avoided.

According to a first aspect of the invention a calibrating means connected to the measuring probe is provided, which has at least one calibration element, and a calibration distance is pre-specified and defined by the calibration element to the measurement signal transmitter. By means of the calibration element according to the invention a distance is known through the calibration distance between the measurement signal transmitter and the calibration element, which constantly remains unchanged as the measuring probe is lowered into the hole. The calibration element is thereby rigidly connected to the measuring probe via the calibrating means. The calibration distance is available, independently of the positioning and orientation of the measuring probe, for a calibration of the assignment rule and/or comparison measurement. In this way a change in the suspension that influences the measurement precision can be determined and an adaptation and calibration of the assignment rule can be carried out by the measuring device itself.

Calibration of the assignment rule can be understood within the scope of the invention as a first step of calibration to determine the deviation of a measured distance variable from a pre-specified distance variable, and as a second step to derive a correction from this first step to provide the correction to further or the same measured distance variable.

In a second aspect of the invention a measurement signal transmitter is designed to transmit a calibration signal which can be reflected on the calibration element and the measurement signal receiver is designed to receive the calibration signal reflected on the calibration element. According to the invention the calibration signal is to be understood to be a signal that is the same as, or similar to, the measurement signal. The calibration signal passes through a calibration signal path, between transmission and receiving thereof, the calibration signal path being located, like the measurement signal path, within the same or similar medium located in the area of the hole. The measurement signal transmitter for the calibration signal can preferably be the same measurement signal transmitter which also transmits the regular measurement signal. However, a separate transmitter for the calibration signal can also be provided.

In a third aspect of the invention, the assignment rule can be changed and calibrated by means of the evaluation unit based on the calibration signal reflected and received by the calibration element. This aspect of the invention is based on the finding that the properties of the medium in a hole in the ground, in particular a liquid medium, are not constant within the hole and cannot therefore be reliably assumed.

A measurement principle according to the invention can be based preferably on the principle of run time measurement. In this case, a run time t of an emitted, reflected and again received signal is measured by the evaluation unit. Here the measurement signal passes along a signal path on a route to and from the medium present in the signal path, which allows a propagation speed $c_s$ of the measurement signal along the signal path. By knowing or assuming the propagation speed $c_s$ and with the measured signal run time t, a measurement distance d between the measurement signal transmitter and the wall area of the hole, on which the measurement signal was reflected, can be derived according to an assignment rule, in particular also with the following fundamental correlation:

$$d=0.5 \cdot c_s \cdot t$$

As the propagation speed $c_s$ and/or the signal run time t have systematic and/or coincidental uncertainties, the measurement distance d can also have a correspondingly high uncertainty. The determined measurement distance d does not thereby correspond to the actual wall distance between the measurement signal transmitter and the wall area of the hole to be measured.

This uncertainty is extensively removed by the invention with a self-calibration.

Other measurement principles can also be used, for example based on a frequency or signal strength change of the measurement signal.

According to the invention, the assignment rule is understood to be a rule for assignment of the transmitted, reflected and received signal to a distance. An assignment rule, in particular the abovementioned functional correlation for the run time measurement, is dependent on the assumption of the propagation speed $c_s$. It was recognised within the scope of the invention that the propagation speed $c_s$ of a signal can change as a function of the lowering position in the hole, as the density and consistency of the filling suspension can change considerably over the depth of the hole.

The calibration of the assignment rule can be understood within the scope of the invention furthermore as a first step to determine the propagation speed $c_s$ by means of the run time of the calibration signal and the predefined distance (calibration distance) of the two between the measurement signal transmitter and calibration element, and as a second step, to use the ascertained propagation speed $c_s$ from the first step to determine the wall distance with the abovementioned functional correlation. A calibration and change of the assignment rule are thus brought about.

The aspects of the invention are based on the essential recognition that the physical properties of a medium in a hole in the ground and thus in particular the propagation speed $c_s$ of a measurement signal, in particular an ultrasound measurement signal, change according to place and time. By also lowering, with the measuring probe, the calibration element rigidly connected thereto, a defined calibration distance is constantly available irrespectively of the lowering position. Through this distance, with the received signal, in particular with the run time of the signal, it is made possible to determine physical properties, in particular the propagation speed $c_s$, through corresponding solution of the aforementioned functional correlation, at each lowering position of the measuring probe under the ambient conditions valid for the measurement, in particular the physical properties such as pressure, temperature and density of the medium.

In a particularly preferred embodiment according to the invention the measurement signal transmitter and the measurement signal receiver are designed in combination as at least one measurement signal transceiver, wherein the measurement signal transceiver is designed to transmit the measurement signal and to receive the measurement signal reflected on the wall area of the hole. The measurement signal transceiver can transmit and receive both the measurement signal and also the calibration signal. By combining the transmitter and receiver in one sensor system as a transceiver the necessary sensor elements for transmitting and receiving the signals can be arranged in a space-saving way in the measuring probe. By reducing necessary components of the sensor system, in particular a higher degree of integration and an improved reliability of the sensory elements are achieved.

In principle, the measurement signal transmitter, measurement signal receiver and measurement signal transceiver can be any transmitter, receiver and transceiver of signals. To determine the distance in a hole in the ground filled with a liquid medium, it is advantageous according to a preferred embodiment of the invention that the measurement signal is an ultrasound signal. Ultrasound distance sensors and in particular ultrasound transceivers can determine distances in different media. In this matter, ultrasound can also pass through liquid media, in particular bentonite suspension and water in holes in the ground.

To measure a hole in the ground, according to a refinement of the invention a particularly useful operation is carried out by a lowering means, in particular a winch means arranged above the hole, and at least one lowering rope fixed to the lowering means and connected to the measuring probe to lower the measuring probe into the hole, being provided, wherein the lowering means is designed to receive and release the at least one lowering rope. To lower the measuring probe into a certain lowering position, the lowering rope is released with a certain lowering length into the hole by the winch means. The measuring probe is connected to the winch means in particular by two lowering ropes, wherein the measuring probe has a clamp at its upper side, which is connected to the respectively lowered ends of the lowering ropes at its two clamp ends and holds the measuring probe so that it can be tilted in the middle thereof. In principle it is possible to provide a probe cable with corresponding strain relief through the two lowering ropes between the measuring probe and the evaluation means for data and/or power supply. It is particularly preferred, however, if at least one of the lowering ropes is designed as a probe and/or measuring cable. The measuring probe and the lowering means are further designed in particular to be transportable.

This results in a further advantageous embodiment of the invention in that the at least one lowering rope can be arranged parallel to a lowering axis in at least one lowering position of the measuring probe in the hole, wherein the lowering axis corresponds to a levelling axis of an underground engineering tool for creating the hole. The levelling axis of the underground engineering tool thereby serves as a reference axis for distance measurements of the measuring probe to a wall area of the hole, which are realised in particular in a horizontal manner orthogonally with respect to the reference axis. By arranging the lowering rope vertically with respect to the ground surface and parallel to the lowering axis in at least one lowering position, all distance determinations of the measuring probe starting from corresponding lowering positions along the lowering axis refer in the same way to the reference axis.

In principle, distances of the hole from an axis can be determined in random spatial and temporal resolution. It is particularly efficient according to one embodiment of the invention that the at least one measurement signal transmitter as well as the at least one measurement signal receiver are designed to transmit and receive measurement signals in a continuous way. By transmitting and receiving measurement signals continuously the determination of wall distances in a continuous way is also facilitated. Coordinates of the hole in a regular resolution, in particular in centimetre or decimetre distances, are thereby available as measurement results.

According to a further advantageous embodiment of the invention the measuring probe and the calibrating means are surrounded by an at least partially open housing frame, the housing frame has a symmetry axis parallel to the lowering axis and the common centre of gravity of the measuring probe of the calibrating means and the housing frame lies on the lowering axis. The housing frame, which is at least partially open to keep the signal paths free, offers the calibrating means, which is connected to the measuring probe, protection against external force influences, in particular against impacts. These impacts could change the predefined calibration distance in an undesirable manner, whereby the defined distance between the measurement signal transmitter, receiver and/or transceiver and calibration element would no longer be defined. A symmetry of the housing frame, in particular a rotation symmetry thereof relative to the centre axis of the housing frame, which corresponds during lowering to the lowering axis, facilitates a uniform lowering of the measuring probe with the housing frame without the housing frame drifting off. In order to prevent tilting and rotation of the measuring probe during lowering, the centre of gravity of the measuring probe, the calibrating means and the housing frame is on the lowering axis.

In principle the calibration element can be any reflector or also an active transmitter to reflect or transmit further signals. It is particularly advantageous, however, according to one embodiment of the invention that the calibration element according to the invention has a surface orientated orthogonally with respect to the measurement signal transmitter. Through the orthogonal orientation of the surface relative to the measurement signal transmitter, signals can be reflected in a particularly favourable way. It is also particularly advantageous that the surface has the same or similar properties as the wall area of the hole, on which measurement signals are reflected. Due to the reflection properties, in particular due to the signal intensity received, it is thus alternatively made possible to conclude the calibrating and/or measuring distance based on the signal intensity.

Furthermore it is advantageous according to a further preferred embodiment of the invention that, for transmission of the calibration signal to the calibration element, a separate calibration signal transmitter is provided, and/or for receiving the calibration signal reflected on the calibration element a separate calibration signal receiver is provided. The calibration signal can be the same or similar to an also transmitted measurement signal. By transmitting a signal to the calibration element and/or the wall area, wherein the calibration element is located at least in part in a signal path, the calibration signal can be reflected with a time offset with respect to the also transmitted measurement signal and be received again with double time offset. The received calibration signal then serves for calibration of the received measurement signal. In particular, with a knowledge of the calibration distance, the propagation speed of the signal can be determined and be used to determine the wall distance. Furthermore implementation can also be such that the measurement signal transmitter is also the calibration signal transmitter and the measurement signal receiver is also the calibration signal receiver. The calibration signal transmitter and the calibration signal receiver can also be designed in combination as a calibration signal transceiver.

In a further advantageous embodiment of the invention a plurality of measurement signal transmitters and measurement signal receivers, in particular respectively two, three or four measurement signal transmitters and measurement signal receivers, are provided. By providing a plurality of transmitters, receivers transceivers, a multiple, in particular opposing, or radially fan-shaped distance determination can be carried out at a lowering position. For each transmitter, receiver and/or transceiver a calibrating means can be provided in the respective signal path, or an individual calibrating means can be arranged in an individual signal path on the measuring probe. The radial resolution of the distance measurements can be further increased in that repeated measurements in individual rotation positions can be realised through a rotation of the measuring probe about the lowering axis. By measuring the hole at a plurality of lowering and/or rotation positions, respectively with a plurality of individual distance measurements, a three-dimensional model of the hole and/or the hole progression can also be produced from a plurality of two-dimensional sectional profiles of the hole as a measurement result.

With respect to the method, the object mentioned at the beginning according to the invention is achieved in that, by means of at least one measurement signal transmitter, a calibration signal is transmitted to a calibrating means with at least one calibration element, which is connected to the measuring probe, wherein the calibration element is arranged at a predefined calibrating distance from the measurement signal transmitter, the calibration signal can be reflected on the calibration element, the reflected calibration signal is received by at least one measurement signal receiver and the evaluation unit changes and calibrates the assignment rule based on the received calibration signal. Through this calibration of the assignment rule accompanying the measurement of the hole, it is made possible to adapt the measurement distances assigned by the assignment rule corresponding to the ambient conditions, in particular the signal propagation speed. By calibrating the assignment rule the deviation of the assigned measurement distance from the actual wall distance is corrected.

According to one advantageous embodiment of the method according to the invention the calibration signal is transmitted at the same time as, or with a time offset relative to, the measurement signal. Since ambient conditions can change in time and place during the measurement, it is particularly advantageous to use the calibration signal simultaneously for a correction of the measuring distance which is assigned to the measurement signal. It is further advantageous for the execution of the method that the assignment rule is changed and calibrated in the determination of a plurality of wall distances at a plurality of lowering positions in the hole. Besides the temporal change of the ambient conditions, in particular the pressure, the temperature and the density of the medium, the ambient conditions also change with the lowering position in the hole. The calibration of the assignment rule is thus realised in a position-dependent and automated way, wherein between individual lowering and/or calibrating positions the correction values necessary for the calibration, in particular the corrected signal propagation speed, can also be determined by means of interpolation.

For the precision and reliability of the measuring method it is particularly advantageous according to a further embodiment of the method that measurement signals are transmitted and received during lowering and raising back again to the surface of the measuring probe, wherein the wall distances determined during raising back again to the surface of the measuring device by the evaluation unit are used for controlling the wall distances detected during lowering. Through such a redundant, in particular dual, measurement of the same or similar wall areas of the hole, the precision of the measurement results can be controlled and/or a temporal drifting-off of the precision of the measurement results can be detected. These imprecisions and such drifting-off can also arise if the measuring probe leaves the lowering axis during lowering and/or raising back again to the surface.

There is further provided according to the invention a method for producing a wall in the ground, which is formed from a plurality of wall elements adjacent to each other, wherein a hole is created for each wall element, the hole is measured and the hole is filled with a settable mass to form the wall element. The invention is characterised in that the previously described measuring method is used to measure at least one hole.

The invention will be described below by reference to a preferred embodiment, which is shown schematically in the attached drawing, in which.

Figure 1:
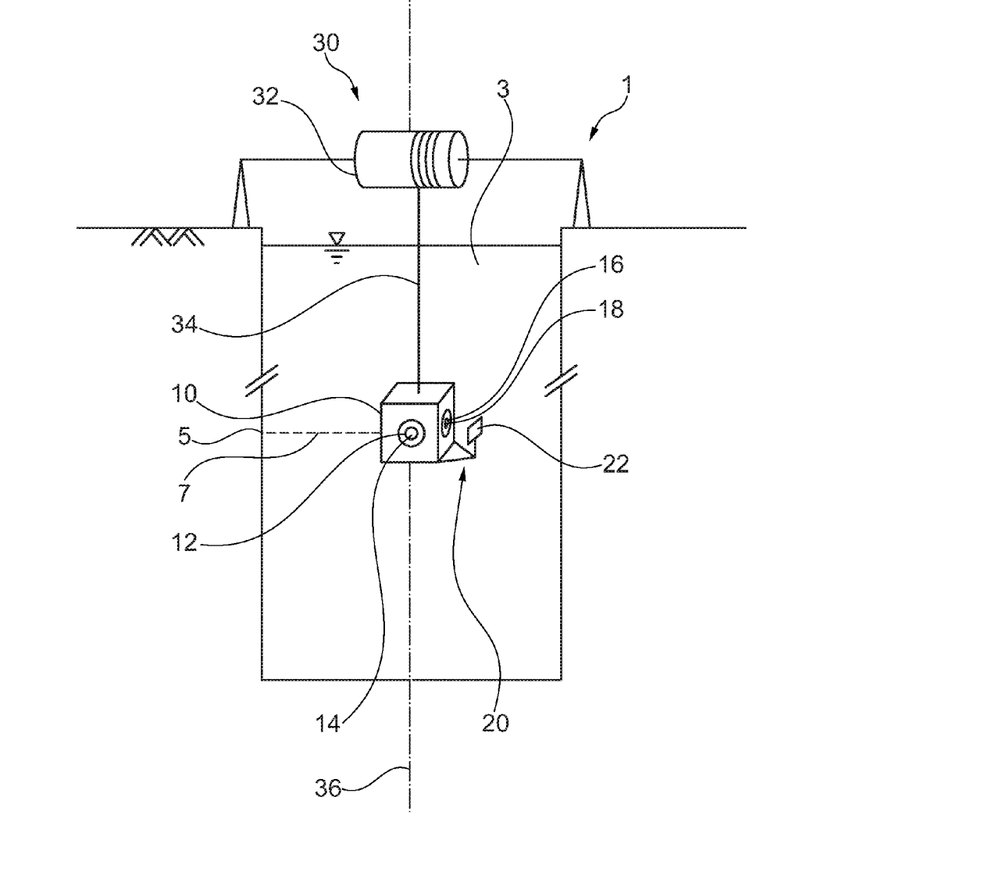
The FIGURE shows a perspective view of a measuring device according to the invention in a hole in the ground.

One embodiment of a measuring device 1 according to the invention will be explained below in association with the FIGURE. The measurement environment for the measuring device 1 is composed, inter alia, of a hole 3 in the ground. The hole 3 is not provided with pipework and is filled with a liquid medium, here bentonite suspension. The measuring probe 10 is located within the hole 3 and is surrounded by the bentonite suspension. The hole 3 was deepened by means of underground engineering equipment. A levelling axis 36 of the underground engineering equipment is present, which corresponds to the lowering axis 36 of the measuring device 1. These axes are vertical and do not correspond, at least in portions, to the centre axis of the hole 3, which is not shown.

To lower the measuring probe 10 in the hole 3, a lowering means 30 is arranged above the hole 3. The lowering means 30 has in particular a winch means 32, on the drum of which the lowering rope 34, which is connected to the measuring probe 10, is wound. The winch means 32 can thereby be locked in any desired lowering position of the measuring probe 10 in the hole 3. Alternatively the measuring probe 10 can be continuously lowered with constant lowering speed into the hole 3. The winch means 32 is also able to raise the measuring probe 10 back to the surface again after reaching the full lowering depth in a lower area of the hole 3, wherein this is also realised along the lowering axis 36.

The measuring probe 10, which is shown in this exemplary embodiment schematically as a cube, has three measurement signal transmitters 12 and three measurement signal receivers 14, one of which each can be seen in the perspective view. The measurement signal transmitters 12 and measurement signal receivers 14 are thereby located centrally on three of the vertical cube surfaces. The measuring probe 10 is designed to be watertight, wherein in particular the measurement signal transmitters 12 and measurement signal receivers 14 are protected against entry of the bentonite suspension. The measuring probe 10 further has a calibration signal transmitter 16 and a calibration signal receiver 18, which are located centrally on the fourth vertical cube surface. On the measuring probe 10 a calibrating means 20 is arranged on the side of the fourth cube surface, the calibrating means 20 being composed of a plurality of struts and a calibration element 22 held on them. The distance between the calibration signal transmitter 16 and calibration element 22 in this exemplary embodiment is between 10 cm and 50 cm. The calibrating means 20, which holds the calibration element 22, is rigidly and securely connected to the measuring probe 10. While corresponding wall distances 7 extend between the measurement signal transmitters 12 and measurement signal receivers 14 and the corresponding wall areas 5 of the hole 3, a calibration distance to the calibration element 22 is formed between the calibration signal transmitter 16 which is located on the same cube side as the calibration element 22. This arrangement serves for the correction of all measurement distances by means of a calibration of the assignment rule. In the exemplary embodiment, it can also optionally be provided to use the calibration signal transmitter 16 also as an additional fourth measurement signal transmitter 12, wherein the calibration element is located in part in the signal path between the calibration signal transmitter 16 and a corresponding wall area 5 to be measured, wherein a signal response is reflected, with a time offset, by the calibration element 22 and the wall area 5.

The invention claimed is:

1. A measuring device for measuring a hole in the ground, having
 a measuring probe that can be lowered into the hole, having
  a measurement signal transmitter to transmit a measurement signal,
  a measurement signal receiver to receive a measurement signal from a wall area of the hole,
  a calibration signal transmitter to transmit a calibration signal to a calibration element, and
  a calibration signal receiver to receive a calibration signal reflected on the calibration element, and
 an evaluation unit to determine a wall distance between the measurement signal transmitter and the wall area of the hole, wherein a measurement distance can be assigned to the received, reflected measurement signal based on an assignment rule,
 wherein by means of the evaluation unit the assignment rule can be changed and calibrated based on the calibration signal reflected and received by the calibration element,
 wherein
 the calibration element is rigidly attached to the side of the measuring probe with a defined calibration distance,
 the measurement signal transmitter is designed to transmit the measurement signal and the calibration signal transmitter to transmit the calibration signal laterally towards the wall area of the hole,
 the measurement signal transmitter and the calibration signal transmitter are designed to transmit ultrasound signals, the measurement signal receiver and the calibration signal receiver are designed to receive the reflected ultrasound signals, and the measurement signal transmitter and the measurement signal receiver are designed in combination as the measurement signal transceiver, wherein the measurement signal transceiver is designed to transmit the measurement signal and to receive the measurement signal reflected on the wall area of the hole.

2. The measuring device according to claim 1, wherein
a lowering means, in particular a winch means arranged above the hole, and at least one lowering rope attached to the lowering means and connected to the measuring probe are provided for lowering the measuring probe into the hole, wherein the lowering means is designed to receive and release the at least one lowering rope.

3. The measuring device according to claim 2, wherein
the at least one lowering rope can be arranged parallel to a lowering axis in at least one lowering position of the measuring probe in the hole, wherein the lowering axis corresponds to a levelling axis of a underground engineering tool for creating the hole.

4. The measuring device according to claim 1, wherein
the at least one measurement signal transmitter and the at least one measurement signal receiver are designed to transmit and receive measurement signals in a continuous way.

5. The measuring device according to claim 1, wherein
the measuring probe and the calibrating means are surrounded by a housing frame that is open at least in part,
the housing frame has a symmetry axis parallel to the lowering axis and
the common centre of gravity of the measuring probe, the calibrating means and the housing frame lies on the lowering axis.

6. The measuring device according to claim 1, wherein
the calibration element has a surface orientated orthogonally with respect to the measurement signal transmitter.

7. The measuring device according to claim 1, wherein
to transmit the calibration signal to the calibration element a separate calibration signal transmitter is provided and/or to receive the calibration signal reflected on the calibration element a separate calibration signal receiver is provided.

8. A method for producing a wall in the ground, in particular a bored pile wall or diaphragm wall, which is formed from a plurality of wall elements adjacent to each other, wherein
a hole is created for each wall element,
each hole is measured, and
each hole is filled with a settable mass to form the wall element,
wherein a measuring method is used to measure at least one hole of the holes, in particular with a measuring device, wherein
a measuring probe is lowered with a lowering means into a lowering position in the at least one hole,
a measurement signal transmitter of the measuring probe transmits a measurement signal towards a wall area of the at least one hole, a measurement signal receiver of the measuring probe receives a measurement signal from a wall area of the at least one hole,
a calibration signal transmitter of the measuring probe transmits a calibration signal to a calibration element,
a calibration signal receiver of the measuring probe receives a calibration signal reflected on the calibration element,
an evaluation unit determines a wall distance between the measurement signal transmitter and the wall area of the at least one hole,
a measuring distance is assigned to the received, reflected measurement signal based on an assignment rule, and
the evaluation unit changes and calibrates the assignment rule based on the calibration signal reflected and received by the calibration element,
wherein
the calibration element is attached rigidly to the side of the measuring probe with a defined calibration distance,
the measurement signal transmitter transmits the measurement signal and the calibration signal transmitter transmits the calibration signal laterally towards the wall area of the at least one hole,
the measurement signal transmitter and the calibration signal transmitter transmit ultrasound signals, and
the measurement signal receiver and the calibration signal receiver receive the reflected ultrasound signals,
wherein the measuring device has
the measuring probe that can be lowered into the hole, having
the measurement signal transmitter to transmit the measurement signal,
the measurement signal receiver to receive the measurement signal from the wall area of the at least one hole,
the calibration signal transmitter to transmit the calibration signal to the calibration element, and
the calibration signal receiver to receive the calibration signal reflected on the calibration element, and
the evaluation unit to determine the wall distance between the measurement signal transmitter and the wall area of the at least one hole, wherein the measurement distance can be assigned to the received, reflected measurement signal based on the assignment rule,
wherein by means of the evaluation unit the assignment rule can be changed and calibrated based on the calibration signal reflected and received by the calibration element,
wherein
the calibration element is rigidly attached to the side of the measuring probe with the defined calibration distance,
the measurement signal transmitter is designed to transmit the measurement signal and the calibration signal transmitter to transmit the calibration signal laterally towards the wall area of the at least one hole,
the measurement signal transmitter and the calibration signal transmitter are designed to transmit the ultrasound signals,
the measurement signal receiver and the calibration signal receiver are designed to receive the reflected ultrasound signals, and
the measurement signal transmitter and the measurement signal receiver are designed in combination as the measurement signal transceiver, wherein the measurement signal transceiver is designed to transmit the measurement signal and to receive the measurement signal reflected on the wall area of the at least one hole.

9. The method according to claim 8,
wherein
a lowering means, in particular a winch means arranged above the hole, and at least one lowering rope attached to the lowering means and connected to the measuring probe are provided for lowering the measuring probe into the hole, wherein the lowering means is designed to receive and release the at least one lowering rope.

10. The method according to claim 9,
wherein
the at least one lowering rope can be arranged parallel to a lowering axis in at least one lowering position of the measuring probe in the hole, wherein the lowering axis corresponds to a levelling axis of a underground engineering tool for creating the hole.

11. The method according to claim 8,
wherein
the at least one measurement signal transmitter and the at least one measurement signal receiver are designed to transmit and receive measurement signals in a continuous way.

12. The method according to claim 8,
wherein
the measuring probe and the calibrating means are surrounded by a housing frame that is open at least in part,
the housing frame has a symmetry axis parallel to the lowering axis and
the common centre of gravity of the measuring probe, the calibrating means and the housing frame lies on the lowering axis.

13. The method according to claim 8,
wherein
the calibration element has a surface orientated orthogonally with respect to the measurement signal transmitter.

14. The method according to claim 8,
wherein
to transmit the calibration signal to the calibration element a separate calibration signal transmitter is provided and/or to receive the calibration signal reflected on the calibration element a separate calibration signal receiver is provided.

15. The method according to claim 8,
wherein
the calibration signal is transmitted simultaneously or temporally offset with respect to the measurement signal.

16. The method according to claim 8,
wherein
the assignment rule is changed and calibrated in the determination of a plurality of wall distances at a plurality of lowering positions in the hole.

17. The method according to claim 8,
wherein
measurement signals are transmitted and received during lowering and raising back again to the surface of the measuring probe, wherein the wall distances determined by the evaluation unit during raising back again to the surface of the measuring probe are used to control the wall distances detected during lowering.

18. A measuring device for measuring a hole in the ground, having
a measuring probe that can be lowered into the hole, having
a measurement signal transmitter to transmit a measurement signal,
a measurement signal receiver to receive a measurement signal from a wall area of the hole,
a calibration signal transmitter to transmit a calibration signal to a calibration element, and
a calibration signal receiver to receive a calibration signal reflected on the calibration element, and
an evaluation unit to determine a wall distance between the measurement signal transmitter and the wall area of the hole, wherein a measurement distance can be assigned to the received, reflected measurement signal based on an assignment rule,
wherein by means of the evaluation unit the assignment rule can be changed and calibrated based on the calibration signal reflected and received by the calibration element,
wherein
the calibration element is rigidly attached to the side of the measuring probe with a defined calibration distance,
the measurement signal transmitter is designed to transmit the measurement signal and the calibration signal transmitter to transmit the calibration signal laterally towards the wall area of the hole,
the measurement signal transmitter and the calibration signal transmitter are designed to transmit ultrasound signals,
the measurement signal receiver and the calibration signal receiver are designed to receive the reflected ultrasound signals, and
in each case a plurality of measurement signal transmitters and measurement signal receivers, in particular respectively two, three or four measurement signal transmitters and measurement signal receivers, are provided.

19. The measuring device according to claim 18,
wherein
a lowering means, in particular a winch means arranged above the hole, and at least one lowering rope attached to the lowering means and connected to the measuring probe are provided for lowering the measuring probe into the hole, wherein the lowering means is designed to receive and release the at least one lowering rope.

20. The measuring device according to claim 19,
wherein
the at least one lowering rope can be arranged parallel to a lowering axis in at least one lowering position of the measuring probe in the hole, wherein the lowering axis corresponds to a levelling axis of a underground engineering tool for creating the hole.

21. The measuring device according to claim 18,
wherein
the at least one measurement signal transmitter and the at least one measurement signal receiver are designed to transmit and receive measurement signals in a continuous way.

22. The measuring device according to claim 18,
wherein
the measuring probe and the calibrating means are surrounded by a housing frame that is open at least in part,
the housing frame has a symmetry axis parallel to the lowering axis and
the common centre of gravity of the measuring probe, the calibrating means and the housing frame lies on the lowering axis.

23. The measuring device according to claim 18, wherein
the calibration element has a surface orientated orthogonally with respect to the measurement signal transmitter.

24. The measuring device according to claim 18, wherein
to transmit the calibration signal to the calibration element a separate calibration signal transmitter is provided and/or to receive the calibration signal reflected on the calibration element a separate calibration signal receiver is provided.

25. A method for producing a wall in the ground, in particular a bored pile wall or diaphragm wall, which is formed from a plurality of wall elements adjacent to each other, wherein
a hole is created for each wall element,
each hole is measured, and
each hole is filled with a settable mass to form the wall element,
wherein a measuring method is used to measure at least one hole of the holes, in particular with a measuring device, wherein
a measuring probe is lowered with a lowering means into a lowering position in the at least one hole,
a measurement signal transmitter of the measuring probe transmits a measurement signal towards a wall area of the at least one hole,
a measurement signal receiver of the measuring probe receives a measurement signal from a wall area of the at least one hole,
a calibration signal transmitter of the measuring probe transmits a calibration signal to a calibration element,
a calibration signal receiver of the measuring probe receives a calibration signal reflected on the calibration element,
an evaluation unit determines a wall distance between the measurement signal transmitter and the wall area of the at least one hole,
a measuring distance is assigned to the received, reflected measurement signal based on an assignment rule, and
the evaluation unit changes and calibrates the assignment rule based on the calibration signal reflected and received by the calibration element,
wherein
the calibration element is attached rigidly to the side of the measuring probe with a defined calibration distance,
the measurement signal transmitter transmits the measurement signal and the calibration signal transmitter transmits the calibration signal laterally towards the wall area of the at least one hole,
the measurement signal transmitter and the calibration signal transmitter transmit ultrasound signals, and
the measurement signal receiver and the calibration signal receiver receive the reflected ultrasound signals,
wherein the measuring device has
the measuring probe that can be lowered into the hole, having
the measurement signal transmitter to transmit the measurement signal,
the measurement signal receiver to receive the measurement signal from the wall area of the at least one hole,
the calibration signal transmitter to transmit the calibration signal to the calibration element, and
the calibration signal receiver to receive the calibration signal reflected on the calibration element, and
the evaluation unit to determine the wall distance between the measurement signal transmitter and the wall area of the at least one hole, wherein the measurement distance can be assigned to the received, reflected measurement signal based on the assignment rule,
wherein by means of the evaluation unit the assignment rule can be changed and calibrated based on the calibration signal reflected and received by the calibration element,
wherein
the calibration element is rigidly attached to the side of the measuring probe with the defined calibration distance,
the measurement signal transmitter is designed to transmit the measurement signal and the calibration signal transmitter to transmit the calibration signal laterally towards the wall area of the at least one hole,
the measurement signal transmitter and the calibration signal transmitter are designed to transmit the ultrasound signals,
the measurement signal receiver and the calibration signal receiver are designed to receive the reflected ultrasound signals, and
in each case a plurality of measurement signal transmitters and measurement signal receivers, in particular respectively two, three or four measurement signal transmitters and measurement signal receivers, are provided.

26. The method according to claim 25, wherein
a lowering means, in particular a winch means arranged above the hole, and at least one lowering rope attached to the lowering means and connected to the measuring probe are provided for lowering the measuring probe into the hole, wherein the lowering means is designed to receive and release the at least one lowering rope.

27. The method according to claim 26, wherein
the at least one lowering rope can be arranged parallel to a lowering axis in at least one lowering position of the measuring probe in the hole, wherein the lowering axis corresponds to a levelling axis of a underground engineering tool for creating the hole.

28. The method according to claim 25, wherein
the at least one measurement signal transmitter and the at least one measurement signal receiver are designed to transmit and receive measurement signals in a continuous way.

29. The method according to claim 25, wherein
the measuring probe and the calibrating means are surrounded by a housing frame that is open at least in part,
the housing frame has a symmetry axis parallel to the lowering axis and
the common centre of gravity of the measuring probe, the calibrating means and the housing frame lies on the lowering axis.

30. The method according to claim 25, wherein
the calibration element has a surface orientated orthogonally with respect to the measurement signal transmitter.

31. The method according to claim 25, wherein
to transmit the calibration signal to the calibration element a separate calibration signal transmitter is provided and/or to receive the calibration signal reflected on the calibration element a separate calibration signal receiver is provided.

32. The method according to claim 25, wherein the calibration signal is transmitted simultaneously or temporally offset with respect to the measurement signal.

33. The method according to claim 25, wherein the assignment rule is changed and calibrated in the determination of a plurality of wall distances at a plurality of lowering positions in the hole.

34. The method according to claim 25, wherein measurement signals are transmitted and received during lowering and raising back again to the surface of the measuring probe, wherein the wall distances determined by the evaluation unit during raising back again to the surface of the measuring probe are used to control the wall distances detected during lowering.

* * * * *